United States Patent [19]
Blanford

[11] Patent Number: 4,679,154
[45] Date of Patent: Jul. 7, 1987

[54] SCANNING CONTROL SYSTEM FOR MERCHANDISE CHECKOUT

[75] Inventor: Denis M. Blanford, Cambridge, Ohio
[73] Assignee: NCR Corporation, Dayton, Ohio
[21] Appl. No.: 753,076
[22] Filed: Jul. 9, 1985
[51] Int. Cl.⁴ ...................... G06F 15/24; G07G 1/00; G06U 7/10
[52] U.S. Cl. .................................. 364/525; 186/61; 235/383; 235/462; 364/405
[58] Field of Search ...................... 235/383, 461, 462; 364/404, 405, 525, 464; 186/60, 61

[56] References Cited

U.S. PATENT DOCUMENTS

| | | | |
|---|---|---|---|
| 3,819,012 | 6/1974 | Beck, Jr. et al. | 186/61 |
| 4,086,476 | 4/1978 | King | 235/462 |
| 4,204,636 | 5/1980 | Hayman | 235/383 |
| 4,468,750 | 8/1984 | Chamoff et al. | 364/405 |
| 4,529,871 | 7/1985 | Davidson | 235/383 |
| 4,554,446 | 11/1985 | Murphy et al. | 235/493 |

OTHER PUBLICATIONS

Electro-Optical Systems Design, vol. 12, No. 6, Jun. 1980, Chicago, U.S., C. C. K. Cheng: "Laser Scanning Systems for Supermarket Automation", Part 1: Basic System, pp. 41–44.
Optical Engineering, vol. 20, No. 1, Jan./Feb. 1981, Bellingham, U.S., P.S. Wu et al.: "Omnidirectional Laser Scanner for Supermarkets", pp. 123–128, see pp. 123, 124.

Primary Examiner—Gary Chin
Assistant Examiner—Daniel W. Juffernbruch
Attorney, Agent, or Firm—Wilbert Hawk, Jr.; Albert L. Sessler, Jr.; Richard W. Lavin

[57] ABSTRACT

A checkout system for processing purchased merchandise items includes a checkout counter in which is located a scanning assembly for scanning a coded label on the purchased item to produce data signals identifying the item purchased, a display member on the counter for displaying the price of the merchandise item purchased, an indicator light and a tone generator located in the display member, a back office processor for obtaining the price of the merchandise item scanned from a price look-up table using the data signals as an address and a data terminal device for printing the price of the items scanned on a record member. Processing means located in the scanning assembly and the display member cycles the operation of the tone generates when the price of the item scanned is not found in the table and cycles the operation of the indicator light whenever a malfunction occurs in the operation of the terminal. In both cases, the operation of the scanning means is disabled.

14 Claims, 8 Drawing Figures

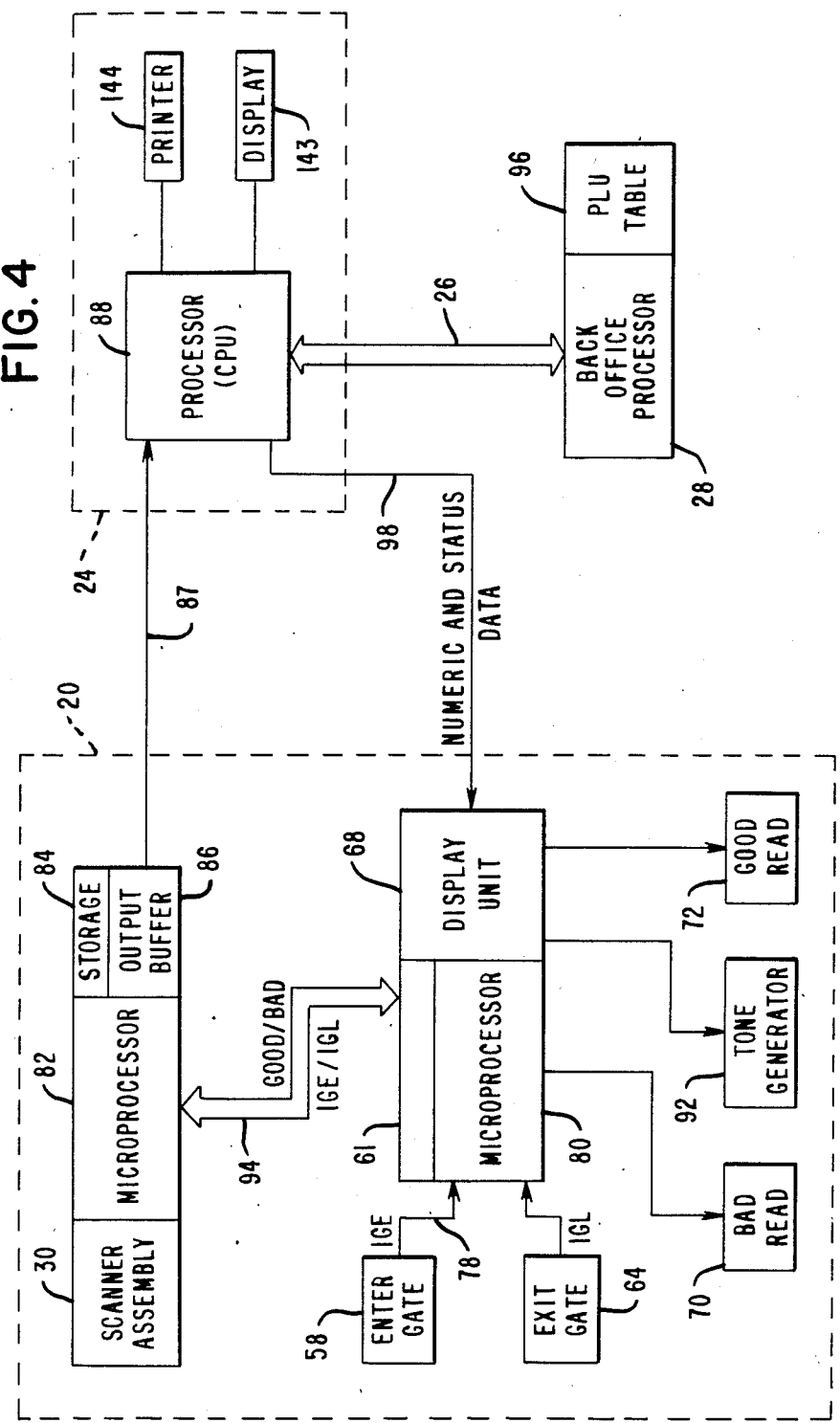

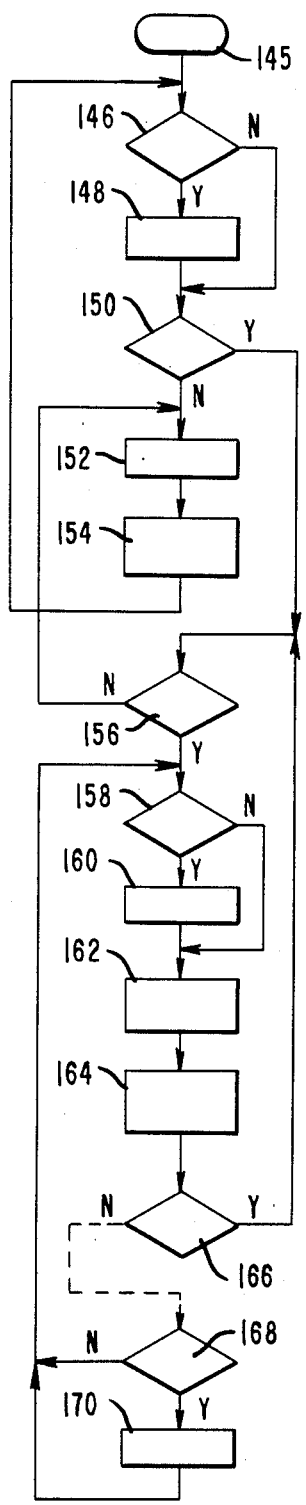

FIG. 7

START

NUMERIC DISPLAY DATA FROM TERMINAL?

DISPLAY CUSTOMER NUMERIC DATA.

STATUS DATA FROM TERMINAL?

PASS ITEM GATE SIGNAL TO SCANNER PROCESSOR

PASS GOOD/BAD READ SIGNAL FROM SCANNER PROCESSOR TO GOOD/BAD LIGHTS AND TONE GENERATOR.

ERROR STATUS AT TERMINAL?

NOT ON FILE. ERROR AT TERMINAL?

BEEP GOOD TONE EVERY 1/3 SECOND.

TURN OFF GOOD READ SIGNAL. TURN BAD LIGHT ON AND OFF EVERY 1/2 SECOND.

DISABLE ITEM GATE SIGNAL TO SCANNER PROCESSOR TO PREVENT FURTHER SCANNING.

STATUS DATA FROM TERMINAL?

NUMERIC DISPLAY DATA FROM TERMINAL?

DISPLAY CUSTOMER NUMERIC DATA.

4,679,154

SCANNING CONTROL SYSTEM FOR MERCHANDISE CHECKOUT

BACKGROUND OF THE INVENTION

The present invention is directed to a checkout scanning system and more particularly to a system for controlling the operation of an optical scanner.

In present day merchandise checkout systems, the use of optical scanners for scanning the Universal Product Code (UPC) labels on purchased merchandise items has become quite common. In the checkout systems in use today, the optical scanner can take the form of a scanner mechanism located in a checkout counter or the form of a hand-held wand. In either case, the optical scanner will scan the bar code pattern that forms the UPC label and generates signals representing the bars and spaces of the pattern for transmission to a processor apparatus which determines the character represented by the bar code pattern. The character which identifies the purchased item is then transmitted to an associated data terminal device and from there to a remote or back office processor which looks up the price of the item in a table located in the processor. The price is then transmitted back through the terminal device where the price is printed on a receipt by a printer mechanism located in the terminal device and then to a customer display member located adjacent the checkout counter where the price of the item is displayed. If an error occurs due to a malfunction of the printer or if the price of the item is not listed in the price-lookup table, error signals are generated notifying the operator to take appropriate actions to correct the situation. In prior optical scanning systems, the error signal would turn on a light indicating the presence of an error condition and generate an error tone in the terminal device. It has been found that because of the noisy environment in which the checkout counter is located, such error signals have not been detected as the operator's attention has been focused on moving the merchandise items past the optical scanner. In the case where the price of the item is not listed in the price look-up table the merchandise items have been processed without being paid for by the customer.

· It is therefor the principal object of this invention to provide an error indicating system for an optical scanning device.

It is another object to this invention to provide an error indicating system for an optical scanning device which can distinguish between the types of errors that have occurred.

SUMMARY OF THE INVENTION

A merchandise item checkout system includes an optical scanning device for generating data by scanning coded labels on purchased merchandise items. The data is transmitted to a remote processor though an associated data terminal device for retrieving from a table the price of the item scanned. If the item is not listed in the table, an error signal is generated which is transmitted to the scanning device enabling a processor located in the scanning device to activate a tone generator to output a plurality of error tones, cycle a light indicator and disable the scanning device from operation. Any other error which may occur as a result of the operation of the terminal device will operate the light indicator and disable the operation of the scanning device only. Thus, the type of error signal indicator that is generated allows the operator to identify the error condition that is present so that appropriate action can be taken to complete the checkout operation.

BRIEF DESCRIPTION OF THE DRAWING

Additional advantages and features of the present invention will become more apparent and fully understood from a reading of the following description, taken in conjunction with the annexed drawings, in which;

FIGS. 4 is a more detailed block diagram of the checkout system of the present invention;

FIG. 7 is a simplified flow diagram illustrating the operation of the checkout system.

DESCRIPTION OF THE PREFERRED EMBODIMENT

Figure 1:
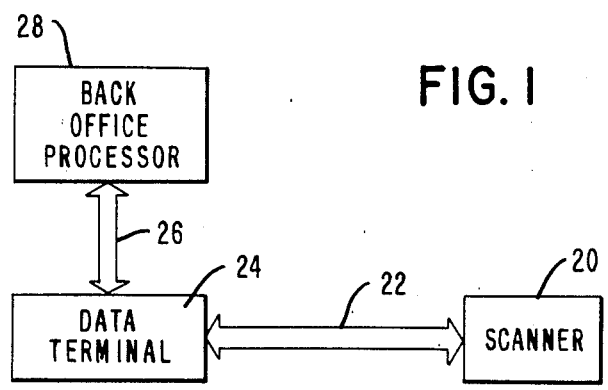
FIG. 1 is a block diagram of the checkout system of the present invention.

Referring now to FIG. 1, there is shown a block diagram of the checkout system of the present invention which includes an optical scanner apparatus 20 for scanning a coded label on a purchased merchandise item and for generating coded signals representing the identity of the purchased item. These signals are transmitted over bus 22 to a data terminal device 24 which in turn transmits the signals over bus 26 to a back office processor 28. The processor 28, utilizing the signals received, determines the price of the purchased item from a price look-up table stored in the processor 28. The numerical data representing the price is transmitted over the bus 26 to the terminal device 24 which prints the price on a receipt member. The data is also transmitted over bus 22 to the scanner apparatus 20 which actuates a customer display member to display the price of the item purchased to the customer.

Figure 2:
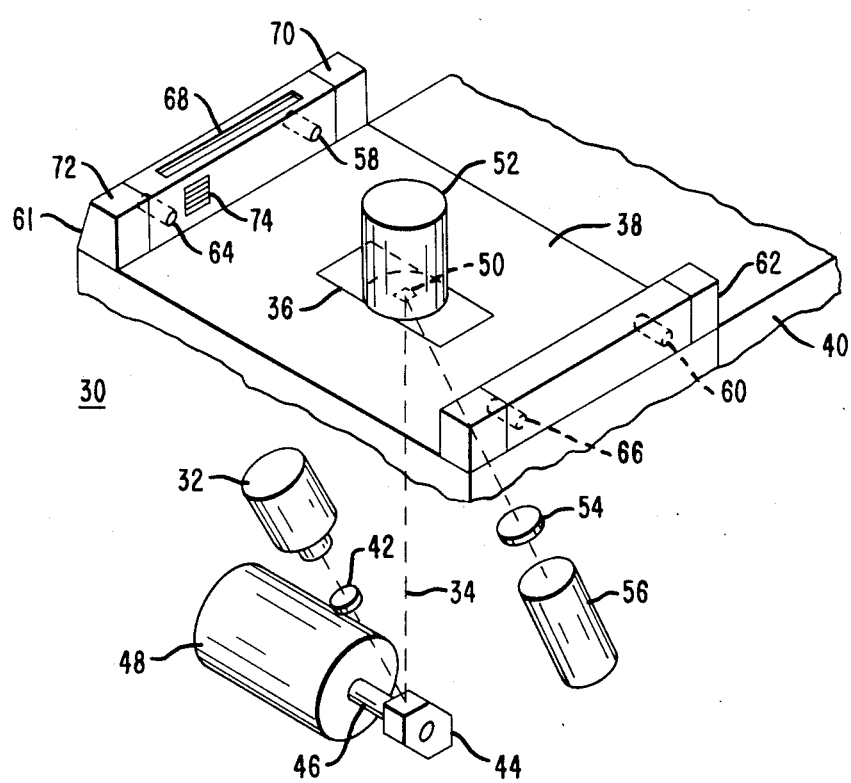
FIG. 2 is a perspective view of a portion of a checkout counter showing the general arrangement of the elements of the scanner assembly and the customer display member.

Referring now to FIG. 2, there is shown a perspective view of the optical scanner apparatus 20 which includes a scanner assembly generally indicated by the numeral 30 comprising a light source 32 emitting an optical scanning light beam 34 in the visible or near visible spectrum, the light beam being directed through an aperture 36 located in a supporting surface 38 of a checkout counter 40. The light source 32 may be a helium or neon laser that is pumped to produce a continuous laser beam of red monochromatic light of approximately 6,328 angstrom wave length.

Figure 3:
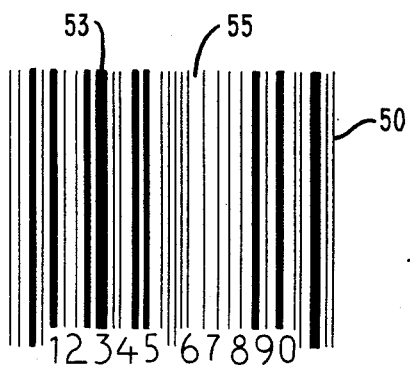
FIG. 3 is a graphical representation of a symbol or coded label such as a UPC coded label.

In a manner that is well known in the art, the light beam 34 produced by the source 32 may be focused by a lens system 42 onto a multi-faced mirror 44. The mirror 44 is mounted on the shaft 46 of a motor 48 which rotates the mirror 44 at a substantially constant speed. The mirror 44 is positioned to intercept the light beam 34 and projects the same through the aperture 36 to scan the encoded indicia located on a label 50 (FIG. 3) fixed to a merchandise item 52. As shown in FIG. 3, the encoded data on the label 50 comprises a plurality of black 53 and white 55 coded areas representing data concerning the identity of the merchandise item. The rotation of the mirror 44 causes a succession of light beams 34 to scan any encoded label 50 positioned over the aperture 36.

The light beam 34 is reflected off the label 50 through an optical filter 54 to a photo-responsive pick-up device such as a photo-multiplier 56 which converts the reflected light beam into electrical signals, the amplitude of which correspond to the amounts of light received. Thus, the amplitude of the light reflected from the white coded area 55 on the label 50 (FIG. 3) will be greater than the light reflected from the black coded area 53. Conventional amplifying circuits will produce a relative high voltage which can be assigned a binary 1 when the beam 34 is scanning a black coded area 53 on the label and a relatively low voltage to which is assigned a binary 0 when scanning a white coded area 55. Thus the information contained on the label 50 can be decoded and used as an input to a processor for use in generating the price of the purchased item 52.

To force a prescribed mode of operation by the checkout operator in order to maximize the operation of the scanner assembly 30, to provide the scanner assembly information as to when a merchandise item 52 is in the scanning area, and to enable the operation of the scanner assembly, sensing means in the form of photodetectors, hereinafter referred to as item gates, are positioned adjacent the front and rear portion of the aperture 36 to detect the presence or absence of a merchandise item 52 in that area. As shown in FIG. 2, the enter item gate may comprise a photodiode 58 or similar photo responsive device mounted in an upstanding customer display member 61 located adjacent one edge of the surface 38 of the checkout counter 40. The photodiode 58 is positioned upstream of the aperture 36 and at a predetermined height above the surface 38 and receives a continuous beam of light from a conventional light source such as a light emitting diode (LED) 60 located in a rail member 62 mounted on the opposite edge of the checkout counter 40 and normally located adjacent the checkout operator. An exit item gate comprising a similar photodiode 64 is positioned downstream of the aperture 36 in the display member 61. The photodiode 64 receives a light beam from a light source 66 located in the rail member 62. Both photodiodes 58, 64 will generate a signal upon the interruption of the light beam in a manner that is well known in the art. Further included in the display member 61 is a light emitting diode (LED) display member 68 which displays the price of the item purchased, a bad read indicator light 70, a good read indicator light 72 and a loud speaker 74 which generates tone signals in a manner that will be described more fully hereinafter.

Referring now to FIG. 4, there is shown a more detailed block diagram of the checkout system of the present invention. Forward movement of a merchandise item 52 (FIG. 2) on the supporting surface 38 of the checkout counter 40 will trip the enter item gate 58 by intercepting the light beams directed from the light source 60, thereby generating the control signal IGE from the photodiode 58 over line 78 to a display microprocessor 80 located in the customer display member 61 (FIG. 2) of the scanner apparatus 20. The scanner apparatus 20 of the present invention, shown within the dotted lines in FIG. 4, includes the scanner assembly 30, a scanner microprocessor 82 for checking and decoding the encoded data read by the scanner assembly 30, a conventional memory storage unit 84, and an output buffer unit 86 for transmitting the data read by the scanner assembly 30 over line 87 which is part of the bus 22 (FIG. 1) and which is coupled to a processor unit (CPU) 88 located in the data terminal device 24. The processor unit 88 may comprise an Intel 4004 which is commercially available from the Intel Corporation of Santa Clara, Calif. The scanner apparatus 20 further includes the enter gate 58 and exit gate 64, the customer display member 61, the display member 68, the display microprocessor 80, the bad read light indicator 70, the good read light indicator 72 and a tone generator 92 which generates tone signals for application to the loud speaker 74 (FIG. 2). Examples of encoded data checking circuits which may be used to check the data read may be found in the U.S. Pat. Nos. 3,784,792, 3,906,203 and 3,753,227.

The control signal IGE appearing on line 78 is transmitted to the microprocessor 80 in the customer display member 61 (FIGS. 2 and 4) and then over bus 94 to the microprocessor 82. The microprocessor 82 in response receiving the signal IGE will turn on the light source 32 (FIG. 2) in the scanner assembly 30. The scanner assembly 30 will then read the label 50 on a merchandise item 52 which is positioned adjacent the aperture 36 and transmits the serial data read to the microprocessor 82. As will be described more fully hereinafter, the microprocessor 82 will decode and check the received serial data to determine if the data is valid or not and then generate the control signals GOOD or BAD over bus 94 to the microprocessor 80 indicating the validity of the data read which, in response to receiving such signals, will turn on either the bad or good light indicator members 70, 72 and operate the tone generator 92 for generating a tone signal indicating a valid read operation if required.

When the encoded serial data read by the scanner assembly 30 is determined by the microprocessor 82 to be valid, the data will be transmitted to the output buffer 86 preparatory for transmission over line 87 of the bus 22 (FIG. 1) to the processor 88 in the data terminal device 24. The processor 88 will encode the received serial data in Manchester code and will transmit the encoded data over bus 26 to the back office processor 28 which, using this data as an address, will access a price look-up table (PLU) 96 for retrieving the price of the merchandise item 52 being scanned. The table resides in RAM memory in the processor 28. The numerical data representing the price of the purchased item 52 is then transmitted over bus 26 to the processor 88 which in turn decodes the Manchester encoded data. The resulting numeric serial data is then transmitted over line 98 of the bus 26 to the microprocessor 80 which controls the display member 68 (FIG. 2) for displaying the price of the purchased item to the customer.

If an error occurs in the operation of the terminal device 24 such as a printer malfunction or if the purchased item is not found in the PLU table 96, status signals indicating the nature of the error are transmitted over line 98 to the microprocessor 80 which disables the operation of the scanner assembly 30 and operates the bad read light indicator 70 and the tone generator 92 indicating the presence of the error in a manner that will be described more fully hereinafter.

Figure 5A:
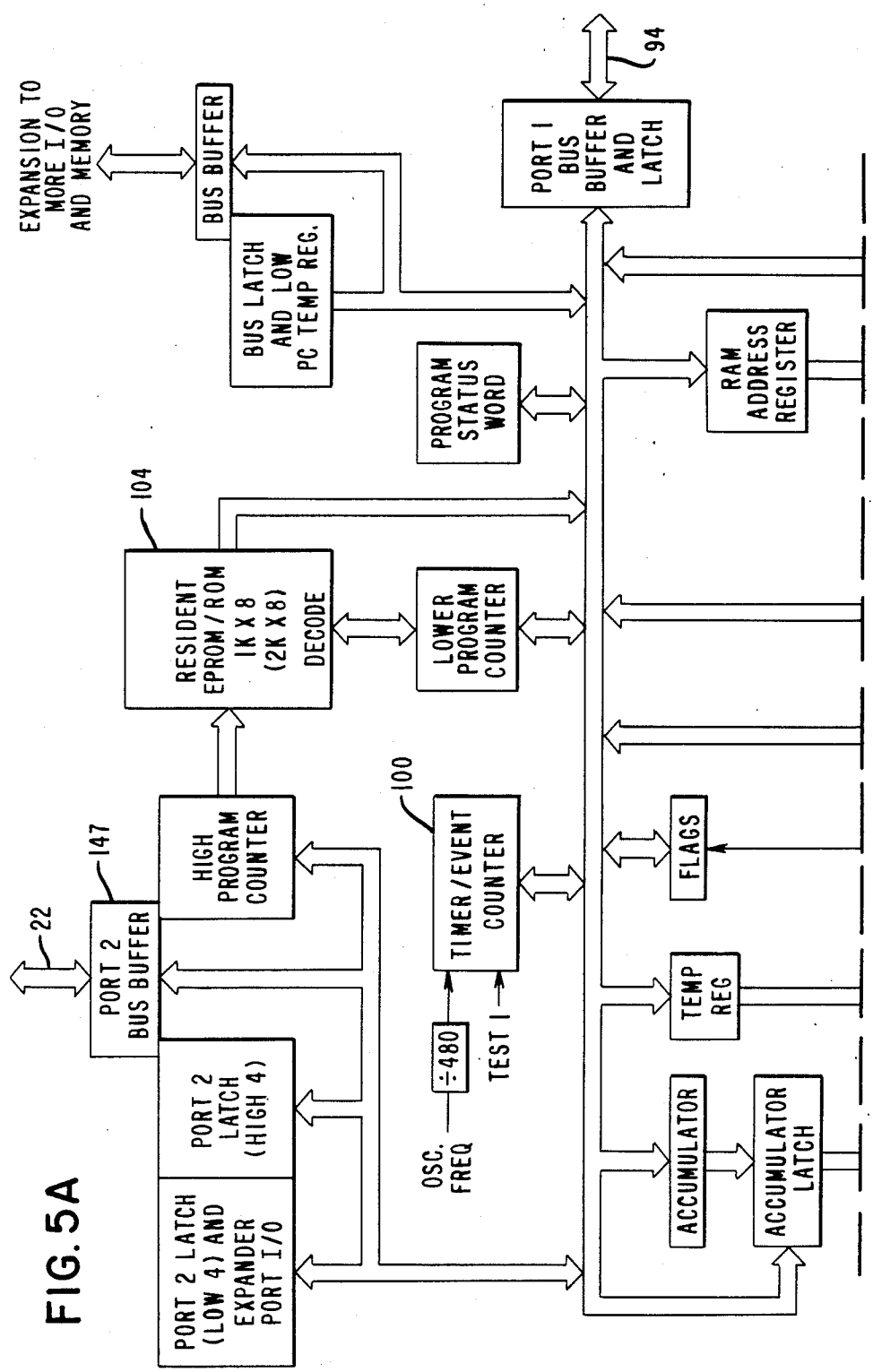
FIGS. 5A and 5B taken together form a block diagram of the microprocessor that is utilized in the scanner assembly and in the customer display member.
Figure 5B:
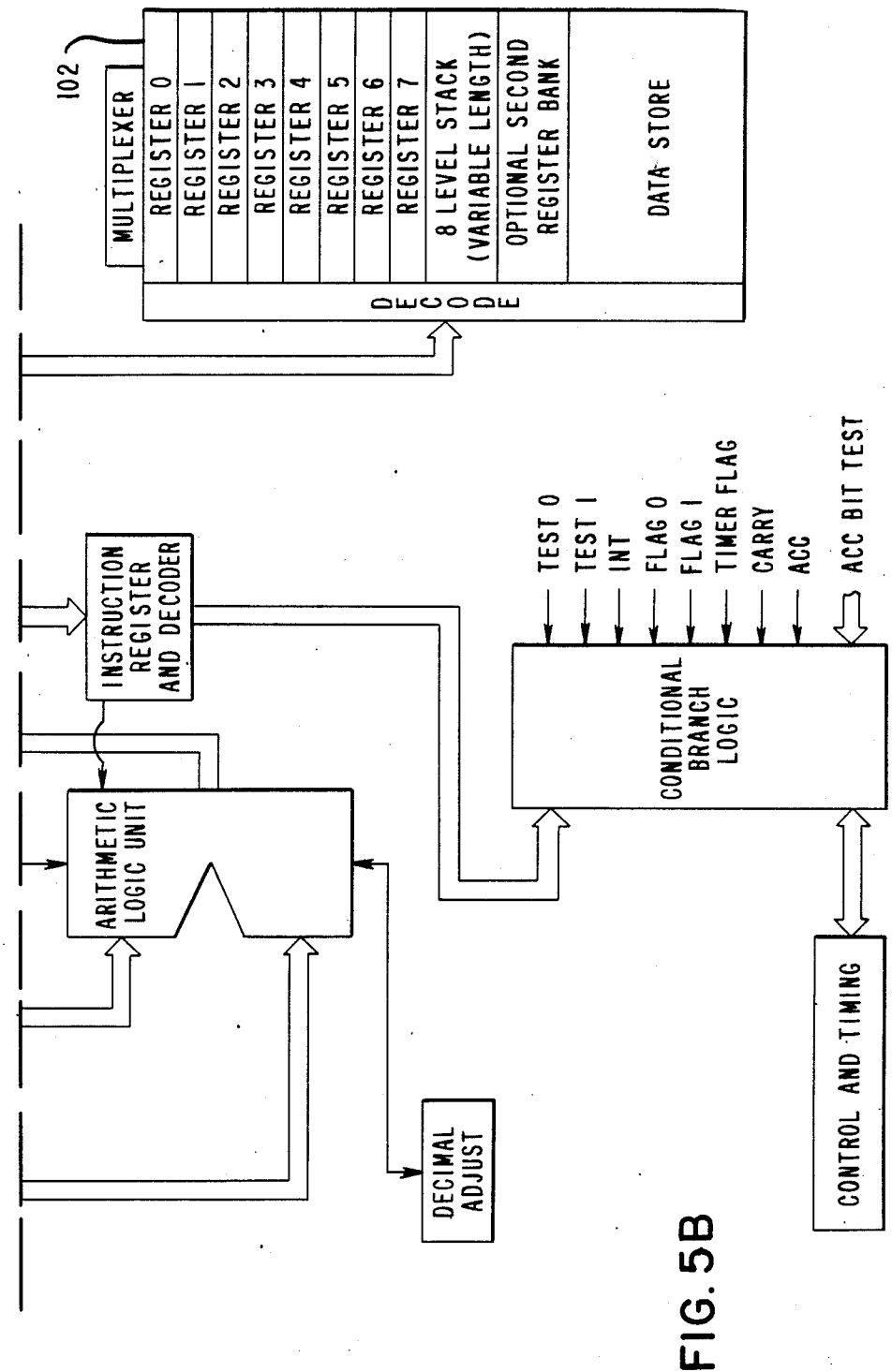

FIGS. 5A and 5B taken together constitute a block diagram of the microprocessors 80 and 82. The microprocessor illustrated in FIGS. 5A and 5B is an Intel 8049 microprocessor which is commercially available from the Intel Corporation of Santa Clara, Calif. Included in the microprocessor 80 is a counter 100 (FIG. 5A) which is enabled upon the microprocessor 80 receiving the signal IGE over the bus 94 (FIG. 4 and 5A). The counter 100 will have stored therein a predetermined count and will be enabled, upon the generation of the signal IGE, to count down to 0 in a manner that is well known in the art, the count representing a time-out period which is used in determining a valid read operation by the scanner assembly 30 in a manner that will be described more fully hereinafter. The microprocessor 80 also includes a plurality of storage registers 102 (FIG. 5B) for temporarily storing the signal IGE generated by the enter item gate 58 (FIG. 4) and the signal IGL generated by the exit gate 64. The control of the microprocessor is found in the software program stored in the EPROM/ROM 104 (FIG. 5A).

Figure 6:
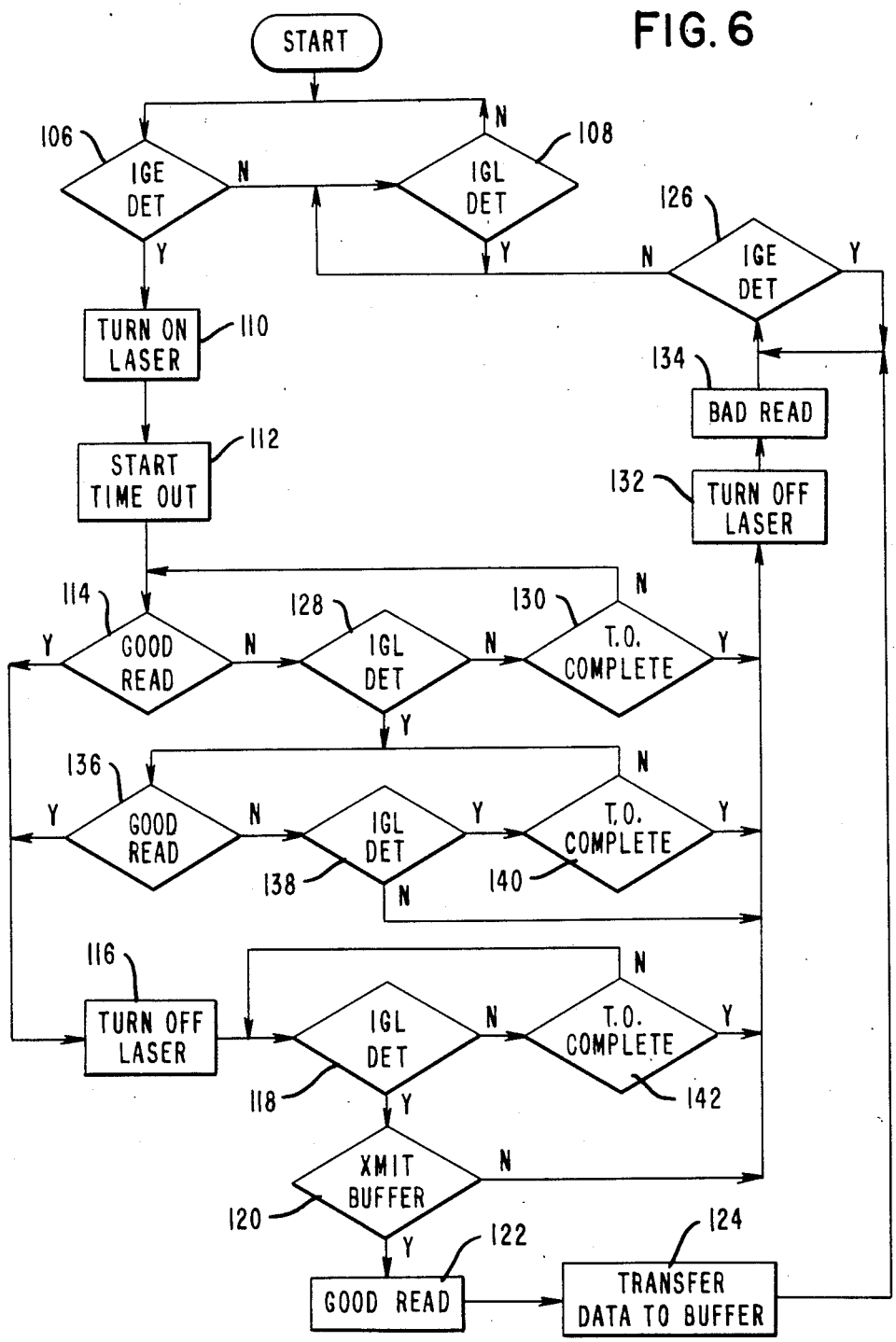
FIG. 6 is a simplified flow diagram illustrating the operation of the scanner assembly.

Referring now to FIG. 6, there is disclosed a flow diagram illustrating the events that occur in the operation of the scanner system 20 (FIG. 1). Prior to the movement of the merchandise item 52 (FIG. 2) past the scanner assembly 30, the microprocessor 82 (FIGS. 4, 5A and 5B) is in an idle state which requires the enter item gate 58 to be tripped in order to initiate a scanning operation. If the operator at this time moves the merchandise item past the aperture 36 (FIG. 2) in the counter surface 38 of the checkout counter 40 without tripping the enter item gate 58, but trips the exit item gate 64 or moves the item 52 in the reverse direction, thereby tripping the exit item gate 64 first, the system will remain in the idle state and cycles between blocks 106 and 108.

Upon the tripping of the enter gate 58 which results in the generation of the signal IGE, the signal is transmitted over line 78 (FIG. 4) through the microprocessor 80 and over the bus 94 to the microprocessor 82. The microprocessor 82 under the control of the program stored in the PROM/ROM 104 (FIG. 5A) will generate the appropriate signals to turn on the laser light source 32 (FIG. 2) (Block 110) and enable the counter 100 (Block 112) in the microprocessor 82 (FIG. 5A) to start the countdown for generating the time-out sequence.

The microprocessor 82 receives the encoded data read by the scanner assembly 30 and initiates a checking and decoding sequence if the data read is determined to be valid (Block 114). If the read operation produces a good read, the microprocessor 82 will turn off the light source 32 (Block 116) and check to see if the exit gate 64 has been tripped (Block 118). If it has been tripped, the microprocessor 82 will check to see if the output buffer 86 (FIG. 4) is available to receive data (Block 120). If it is available, the microprocessor 82 will transmit the good read signal GOOD over bus 94 to the microprocessor 80 in the customer display member 61 (FIGS. 2 and 5) which in turn will turn on the good read light indicator 72 (Block 122). The microprocessor 82 will also transfer the data read to the buffer 86 for transmission over line 87 to the processor 88 (FIG. 4) in the data terminal device 24. Upon the returning of the enter item gate 58 (FIG. 4) to its clear condition (Block 126), the microprocessor 82 will return to an idle state preparatory to another scanning operation.

If after the light source 32 (FIG. 2) has been turned on and the microprocessor 82 determines that the data read is invalid, the microprocessor 82 will check the exit item gate 64 (FIG. 4) (Block 128) to see if it has been tripped. If it has not been tripped, the processor 82 will cycle through blocks 128, 130 and 114 until a good read has been determined (Block 114) or until the event counter 100 (FIG. 5A) has timed out (Block 130). If the time-out occurs first, the light source 32 will be turned off (Block 132), the bad read indicator light 70 (FIG. 4) is illuminated (Block 134) and the microprocessor 82 returns to wait for the next read operation. If the enter item gate 58 and the exit item gate 64 are tripped but the scanner assembly 30 fails to detect a good read, the microprocessor 82 will go through blocks 128, 136, 138 and 140 to turn off the scanner assembly 30 preparatory to another read operation.

If a good read is obtained but the exit item gate 64 (FIG. 4) is not tripped, the microprocessor 82 will cycle between blocks 118 and 142 until the time-out occurs resetting the scanner assembly 30 (FIG. 4) preparatory to a new read operation in the manner described above. If the exit item gate 64 does trip but the buffer 86 (FIG. 4) is not available to receive the data (block 120) the microprocessor 82 will generate the required signals to turn off the laser light source 32 (FIG. 2) (Block 132) and illuminate the bad read indicator 70 (Block 134) forcing the operator into another read operation.

Referring now to FIG. 7, there is disclosed a flow chart of the program stored in the EPROM/ROM 104 (FIG. 5A) of the microprocessor 80. When data is transferred from the output buffer 86 over line 87 to the processor 88 in the data terminal device 24, the processor 88 will encode the received data in Manchester code and transmit the data over bus 26 to the back office processor 28 (FIG. 4) which uses the data to address the table 96 in which is stored the price of the merchandise items being offered for sale. The processor 28, which may comprise NCR 8060 minicomputer and which is commercially available from the NCR Corporation of Dayton, Ohio, will retrieve the price of the purchased item using the encoded data received and transmit the Manchester encoded price data to the processor 88 in the terminal device 24. The processor 88 will decode the received price data and transmit the numeric data representing the price of the purchased item over line 98 to the customer display member 68 where the price of the item is displayed. The price is also displayed in the terminal display 143 (FIG. 4) and also printed on a record member by the terminal printer 144.

If in the operation of the checkout system, an error occurs in the operation of the terminal 24 which may be the result of a printer malfunction, the cash drawer of the terminal (not shown) being in an open state, or other types of terminal malfunctions, a terminal error signal in the form of binary bits is generated by the processor 88 and transmitted over line 98 (FIG. 4) as status data to the microprocessor 80 in the display member 61 (FIG. 2). If the price of the purchased item is not listed in the PLU table 96, a Not-on-File error is generated by the processor 28 as part of the status data which is transmitted through the processor 88 and over line 98 to the microprocessor 80.

The microprocessor 80 at this time, after the system has been initialized (Block 145), will be checking (Block 146) the port bus buffer 147 (FIG. 5A) coupled to the line 98 (FIG. 4) of the bus 22 (FIG. 1) to detect the presence of any numeric data transmitted from the terminal 24 which represents the price of the purchased item. If the numeric data is present, it will enable the display member 68 to display the price (Block 148). If the numeric data is not present, it will check (Block 150)

to see if there is present on line 98 status data transmitted from the terminal 24. If there is status data on line 98, the microprocessor 80 will check (Block 156) to see if the status data indicates an error condition at the terminal. If the status data indicates that it is not a error condition, the microprocessor 80 will transmit (Block 152) any item gate signals (IGE or IGL) (Block 152) that have been generated to the microprocessor 82 over bus 94 (FIG. 4). The microprocessor 80 will also transfer any good/bad read signal received over the bus 94 from the microprocessor 82 to the appropriate read indicators 70 and 72 for displaying such signals (Block 154). At this point, the microprocessor 80 again checks to detect (Block 146) the presence of numeric or status data on line 98.

If the microprocessor 80 detects (Block 156) the presence of error status data on line 98, it will check the binary bits of the status data to determine if the error is a "Not-On-File" error (Block 158). If it is a "Not-On-File" error, the microprocessor cycles (Block 160) the tone generator 92 to generate a tone every ⅛ second, turns off the good read signal (Block 162), disabling the indicator member 72, and cycles the bad read indicator member 70 every ½ second (Block 162). The microprocessor 80 also disables (Block 164) the signals (IGE, IGL) generated by the item gates 58, 64 from being transmitted over the bus 94 (FIG. 4) to the microprocessor 82 which results in the turning off of the light source 32 (FIG. 2) upon the counter 100 (FIG. 5A) generating a time-out signal. The cycling of the tone generator 92 (FIG. 4), the bad read indicator 70 and the disabling of the scanner assembly requires the operator to restart the scanning sequence by depressing a control key on the keyboard (not shown) of the terminal device 24 such as the clear key. This action will remove the status data from appearing on line 98.

The microprocessor 80 will at this time check (Block 166) to see if there is still status data from the terminal appearing on line 98. If there is, the microprocessor 80 will again determine if the status data represents a "Not-On-File" error condition. If it does, the error indicator sequence described above is continued. If the error is not a "Not-On-File" error but comprises a terminal error such as a printer malfunction or other type of terminal error as described previously, the cycling of the bad read indicator member 70 (Block 162) will occur. Further, the scanner assembly is disabled (Block 164) in the manner described above.

If the error binary bits representing the status data have been removed from the line 98 (Block 166) the processor will again check (Block 168) to see if there is present on line 98 any numeric data representing the price of a purchased item, and if there is, will display (Block 170) the price in the customer display member 68 (FIG. 1).

The following is a program listing in Intel 8049 object code for the system operation described above in connection with the flow chart found in FIG. 7.

| ADDRESS (HEX) | OBJECT CODE | | | | | | | | | | | | | | | |
|---|---|---|---|---|---|---|---|---|---|---|---|---|---|---|---|---|
| 000 | E5 | 04 | EC | 44 | 57 | A3 | 83 | D5 | AA | 23 | 1D | 62 | 55 | EC | 14 | BC |
| 010 | 64 | ED | 14 | 1D | EF | 17 | 1F | 86 | 45 | C5 | FD | 53 | 81 | D5 | C6 | 45 |
| 020 | 37 | 12 | 36 | 09 | 52 | 36 | 86 | 45 | CB | FB | B2 | 34 | 96 | 36 | BB | 21 |
| 030 | 89 | 40 | 04 | 36 | 99 | BF | 86 | 45 | EE | 45 | BE | 32 | 09 | B2 | 43 | 89 |
| 040 | 20 | 04 | 45 | 99 | DF | FA | 93 | C5 | FD | 53 | E1 | C6 | 8B | F2 | 72 | 99 |
| 050 | BF | 89 | 20 | 8A | 3F | 0A | 52 | 5E | FD | B2 | 66 | 0A | 72 | A6 | 15 | FD |
| 060 | 53 | 9E | AD | 05 | 04 | 8B | 0A | 72 | 6A | 93 | 15 | FD | 53 | DF | AD | 05 |
| 070 | 04 | A6 | D2 | 69 | 99 | 3D | FF | 53 | 01 | 43 | 40 | 15 | 4D | AD | 05 | 0A |
| 080 | 72 | 8A | 52 | 8A | 15 | FD | 43 | 60 | AD | 05 | 93 | 8A | 3F | 0A | 72 | 96 |
| 090 | 52 | 9E | 99 | 9F | 04 | A6 | 52 | A4 | 99 | DF | 89 | 40 | 04 | A6 | 99 | BF |
| 0A0 | 89 | 20 | 04 | A6 | 89 | 60 | 0A | E7 | E7 | 43 | 3F | 3A | AE | 53 | C0 | C6 |
| 0B0 | BE | D5 | FD | 07 | 96 | BB | C5 | FE | 37 | D2 | BE | D5 | BD | 0A | C5 | 93 |
| 0C0 | 00 | 00 | 00 | 00 | 00 | 00 | 00 | 00 | 00 | 00 | 00 | 00 | 00 | 00 | 00 | 00 |
| 0D0 | 00 | 00 | 00 | 00 | 00 | 00 | 00 | 00 | 00 | 00 | 00 | 00 | 00 | 00 | 00 | 00 |
| 0E0 | 00 | 00 | 00 | 00 | 00 | 00 | 00 | 00 | 00 | 00 | 00 | 00 | 15 | 35 | C5 | 23 |
| 0F0 | 7D | 39 | 23 | FF | 3A | 34 | 44 | B9 | 0B | 27 | A1 | AA | BB | 04 | A8 | D7 |
| 100 | F1 | 03 | 1A | A3 | C9 | A1 | 19 | 34 | 13 | 68 | A8 | EA | 07 | 11 | EB | 00 |
| 110 | 17 | 24 | 22 | 23 | 02 | D7 | FA | 83 | A3 | 83 | 05 | 18 | 12 | F3 | 04 | 04 |
| 120 | 04 | 04 | C6 | 45 | B8 | 39 | B9 | 3A | BD | 10 | 27 | A0 | C8 | A0 | C8 | B0 |
| 130 | 3B | C8 | B0 | 7D | C8 | B0 | 2C | C8 | B0 | 2B | C8 | A0 | C8 | A0 | 74 | 98 |
| 140 | 14 | 47 | 04 | EC | 93 | 15 | E5 | C5 | 35 | 8A | FF | 89 | 1F | 99 | 7D | 27 |
| 150 | D7 | 34 | 44 | 85 | A5 | BC | 40 | 37 | 90 | EC | 58 | 89 | 80 | 99 | 7D | B8 |
| 160 | 08 | B9 | 38 | 27 | A0 | 18 | C9 | F9 | 96 | 63 | 17 | D5 | AB | AC | BD | 0A |
| 170 | AE | AF | C5 | 23 | 1D | 62 | 55 | 25 | BF | FF | BD | 00 | BB | 08 | B9 | 30 |
| 180 | 27 | D7 | 34 | 44 | 05 | C5 | 15 | FD | 53 | EB | AD | 05 | 37 | 72 | 91 | 54 |
| 190 | FC | 14 | 47 | 89 | 1D | 25 | 05 | FD | F2 | 80 | D5 | FD | 07 | C5 | 96 | 80 |
| 1A0 | 05 | 8A | 30 | 0A | 37 | 92 | B3 | D5 | BD | 0A | C5 | 15 | FD | 53 | EF | AD |
| 1B0 | 05 | 24 | 80 | B2 | A0 | 8A | 80 | BE | 32 | 05 | EE | B9 | 1E | 8A | 30 | 0A |
| 1C0 | 92 | A7 | B2 | B9 | 9A | 3F | BE | 32 | 05 | EE | C8 | 1E | 8A | 30 | 0A | B2 |
| 1D0 | A7 | 37 | 92 | C8 | 8A | 40 | BE | 32 | 05 | EE | D8 | 1E | 8A | 30 | 0A | B2 |
| 1E0 | A7 | 92 | D8 | 9A | 3F | D5 | FD | 07 | C5 | C6 | EF | 74 | 21 | 24 | A7 | 54 |
| 1F0 | 14 | 14 | 47 | C5 | FD | 37 | 72 | E5 | 54 | FC | 24 | E5 | 42 | C5 | BE | 05 |
| 200 | 85 | 12 | 04 | 95 | 42 | B6 | 08 | 37 | 12 | 0D | EE | 04 | 55 | 25 | D5 | FF |
| 210 | 07 | 93 | A3 | 83 | 8A | 30 | 0A | 37 | B2 | 4F | 15 | 76 | 21 | B8 | 01 | 97 |
| 220 | B5 | 34 | FC | 96 | 3F | C5 | F8 | 96 | 40 | B6 | 2C | 17 | 95 | BC | 40 | 90 |
| 230 | EC | 2F | B6 | 37 | F8 | F7 | A8 | 89 | 80 | 99 | 7D | D5 | BF | 64 | C5 | 83 |
| 240 | BB | 08 | BC | 08 | F8 | 37 | 90 | 37 | 77 | EC | 45 | EB | 42 | 44 | 34 | 15 |
| 250 | FD | 43 | 10 | AD | 05 | A5 | 93 | C5 | AA | 09 | 92 | DB | 89 | 1F | 08 | 99 |
| 260 | 7D | 09 | 12 | D9 | BC | FF | B8 | 04 | 86 | 70 | E8 | 68 | EC | 66 | 44 | D9 |
| 270 | 09 | 92 | DB | 89 | 1F | 08 | 99 | 7D | F2 | 9D | FD | 53 | 7E | AD | D5 | BE |
| 280 | 01 | C5 | BC | FF | B8 | 04 | 86 | 8E | E8 | 86 | EC | 84 | 44 | D9 | 09 | 92 |
| 290 | DB | 89 | 1F | 08 | 99 | 7D | FA | 93 | 0A | 43 | 01 | 44 | A2 | 72 | 98 | 0A |
| 2A0 | 53 | FE | AF | BC | FF | B8 | 04 | 86 | AF | E8 | A7 | EC | A5 | 44 | D9 | 09 |
| 2B0 | 92 | DB | 89 | 1F | 08 | 99 | 3D | 8A | 80 | FD | 43 | 80 | AD | FA | 93 | 15 |

-continued

| ADDRESS (HEX) | OBJECT CODE | | | | | | | | | | | | | | | |
|---|---|---|---|---|---|---|---|---|---|---|---|---|---|---|---|---|
| 2C0 | FD | 53 | F3 | AD | 05 | B9 | 30 | BB | 08 | 44 | D9 | BC | FF | B8 | 04 | 86 |
| 2D0 | ED | E8 | CF | EC | CD | FD | 43 | 08 | AD | FA | 93 | FD | 52 | 91 | BB | 08 |
| 2E0 | B9 | 30 | 89 | 1F | 08 | 99 | 7D | A1 | 19 | EB | CB | 44 | D5 | 09 | 92 | E2 |
| 2F0 | 44 | 5C | 00 | 00 | 00 | 00 | 00 | 00 | 00 | 00 | 00 | 00 | 85 | C5 | 15 | FD |
| 300 | 43 | 04 | AD | 05 | B8 | 2F | 27 | A0 | 14 | 47 | 23 | CD | 69 | E6 | 2E | 23 |
| 310 | FD | 69 | A8 | F0 | C8 | F2 | 30 | F0 | C8 | F2 | 46 | F0 | F2 | 4E | FD | 92 |
| 320 | 4E | BB | 40 | 27 | 37 | 90 | EB | 25 | 15 | 89 | 80 | 99 | 7D | 05 | 44 | BF |
| 330 | F0 | C8 | F2 | 1E | F0 | F2 | 1E | 64 | 4E | C9 | F1 | D3 | 4F | C6 | 50 | D3 |
| 340 | 4D | 96 | 4E | 19 | 64 | 4E | F0 | F2 | 21 | 89 | 0D | 09 | 72 | 39 | 27 | A1 |
| 350 | 19 | BB | 08 | F9 | A8 | C8 | FD | 92 | 74 | F0 | F2 | 78 | BC | E2 | FD | A3 |
| 360 | D0 | 53 | 7F | C6 | 6D | 1C | FC | D3 | EE | 96 | 5E | 64 | 21 | F0 | C6 | 83 |
| 370 | D3 | 02 | C6 | 8A | EB | 55 | 64 | 98 | FB | 03 | FA | F6 | 21 | 03 | 03 | E6 |
| 380 | 21 | 64 | 5C | FB | 72 | 74 | EB | 93 | 64 | 98 | FB | 72 | 74 | D3 | 07 | C6 |
| 390 | 74 | 64 | 86 | 27 | C8 | A0 | 64 | 86 | FD | 92 | 9D | 14 | 47 | 99 | 7D | BB |
| 3A0 | 08 | F0 | 37 | 90 | 77 | EB | A3 | 18 | F8 | D9 | 96 | 9F | 15 | 89 | 80 | 99 |
| 3B0 | 7D | 05 | FD | 92 | 2E | 14 | 47 | F8 | 03 | F8 | A8 | BB | 08 | 97 | 46 | C1 |
| 3C0 | A7 | FC | 67 | AC | 99 | 7D | 27 | 37 | 90 | EB | BD | F0 | DC | C6 | D9 | B6 |
| 3D0 | 21 | 95 | C9 | F1 | C6 | D7 | 19 | 44 | F0 | 18 | F8 | D9 | C6 | 2E | 14 | 47 |
| 3E0 | 64 | BB | 00 | 02 | 50 | 37 | 57 | 5A | 4F | 6F | 51 | 7F | 5F | 7D | 00 | 00 |
| 3F0 | 00 | 00 | 00 | A3 | 83 | 00 | 00 | 06 | 01 | 00 | 00 | 04 | 05 | 02 | 06 | 9E |

Numerous modifications and adaptations of the system of the present invention will be apparent to those skilled in the art, and thus it is intended by the appended claims to cover all such modifications and adaptations which fall within the true spirit and scope of this invention.

What is claimed is:

1. A checkout system for checking the price of a purchased merchandise item having a coded label located thereon which contains coded indicia representing the identity of the merchandise item comprising;

support means having a transparent portion over which the coded label of the purchased merchandise item is moved;

scanning means mounted within said support means adjacent the transparent portion including a light source operable for projecting scanning light beams through said transparent portion for scanning the coded label, said scanning means generating data signals in response to the scanning of said coded label;

first processing means connected to said scanning means for controlling the operation of said light source, said first processing means outputting the data signals generated by said scanning means in response to the scanning of the coded label by said scanning means;

second processing means connected to said first processing means for receiving the data signal outputted by said first processing means, said second processing means including a table of prices of the merchandise item purchased wherein the second processing means using the data signals received from said first processing means as the address of the merchandise item purchased looks up the price of the item purchased in the table and outputs a first error signal to said first processing means upon not finding the price of the purchased items in the table;

and program means located in said first processing means enabling the said first processing means to disable the operation of said light source in response to the generation of said first error signal.

2. The checkout system of claim 1 which further includes;

display means mounted on said support means for displaying the price of the item purchased, said first processing means including a third processing means mounted in said display means and connected to said first and second processing means for receiving said first error signal;

a data terminal device connected to said second and third processing means, said terminal device adapted to output a second error signal to said third processing means upon the occurrence of a malfunction in the operation of the terminal device; and indicator means mounted in said display means and connected to said third processing means, said indicator means being operated by said third processing means in response to receiving said second error signal to indicate the occurrence of a malfunction in the operation of said terminal device.

3. The checkout system of claim 2 in which said indicator means is turned off and on at a predetermined frequency in response to the third processing means receiving said second error signal.

4. The checkout system of claim 3 in which the frequency of operation of the indicator means is approximately one-half of a second.

5. The checkout system of claim 4 which further includes;

a sound generator means mounted in said display means and connected to said third processing means, said sound generator means being operated by said third processing means in response to said third processing means receiving said first error signal to output a sound signal indicating the occurrence of a failure to find the price of the item purchased in the table.

6. The checkout system of claim 5 in which said sound signal is pulsed at a predetermined frequency.

7. The checkout system of claim 6 in which the predetermined frequency of the sound signal is approximately one-third of a second.

8. A checkout system for checking the price of a purchased merchandise item having a coded label located thereon which contains coded indicia identifying the purchased items comprising;

a checkout counter having a transparent portion over which the coded label of a purchased merchandise item is moved;

a scanning assembly mounted within said counter adjacent the transparent portion of the counter including a light source for projecting scanning light beams through said transparent portion for scanning the coded label of a purchased merchandise item when operated, said scanning assembly generating data signals identifying the purchased item in response to the scanning of the coded label by the light beams;

a display member mounted on said counter adjacent the transparent portion of the counter for displaying the price of the purchased merchandise items scanned by said scanning assembly;

optical sensing means mounted in said display member for generating a control signal upon sensing the presence of a purchased merchandise item adjacent the transparent portion of the counter;

first processing means located in said display member and connected to said sensing means for outputting said control signal;

second processing means connected to said first processing means for receiving said control signal and to said scanning assembly for operating said light source in response to receiving said control signal, said second processing means outputting said data signals in response to the scanning of the coded label by said scanning assembly;

third processing means connected to said first and second processing means for receiving the data signals outputted by said second processing means, said third processing mean including a table of prices of the merchandise items purchased wherein the third processing means using the data signals received from said second processing means as the address of the merchandise item purchased looks up the price of the item purchased in the table and outputs a first error signal to said first processing means upon not finding the price of the purchased item in the table;

and program means located in said first processing means for disabling said first processing means from outputting said control signal whereby the operation of said light source is disabled in response to the generation of said first error signal.

9. The checkout system of claim 8 which further includes;
a data terminal device connected to said first, second and third processing means, said terminal device adapted to output a second error signal to said first processing means upon the occurrence of a malfunction in the operation of the terminal device; and
an indicator light mounted in said display member and connected to said first processing means, said indicator light being operated by said first processing means in response to receiving said second error signal indicating the occurrence of a malfunction in the operation of said terminal device.

10. The checkout system of claim 9 in which said indicator light is turned off and on at predetermined frequency in response to the first processing means receiving said second error signal.

11. The checkout system of claim 10 in which the frequency of operation of the indicator light is approximately one-half of a second.

12. The checkout system of claim 11 which further includes a tone generator mounted in said display member and connected to said first processing means, said tone generator being operated by said first processing means in response to receiving said first error signal to generate a tone indicating the occurrence of a failure to find the item purchased in the table.

13. The checkout system of claim 12 in which said tone generator is turned off and on at a predetermined frequency.

14. The checkout system of claim 13 in which the frequency of operation of the tone generator is approximately one-third of a second.

* * * * *